No. 611,805. Patented Oct. 4, 1898.
J. A. AUTRY.
COMBINED SEED PLANTER AND FERTILIZER DISTRIBUTER.
(Application filed Nov. 29, 1897.)
(No Model.) 2 Sheets—Sheet 1.
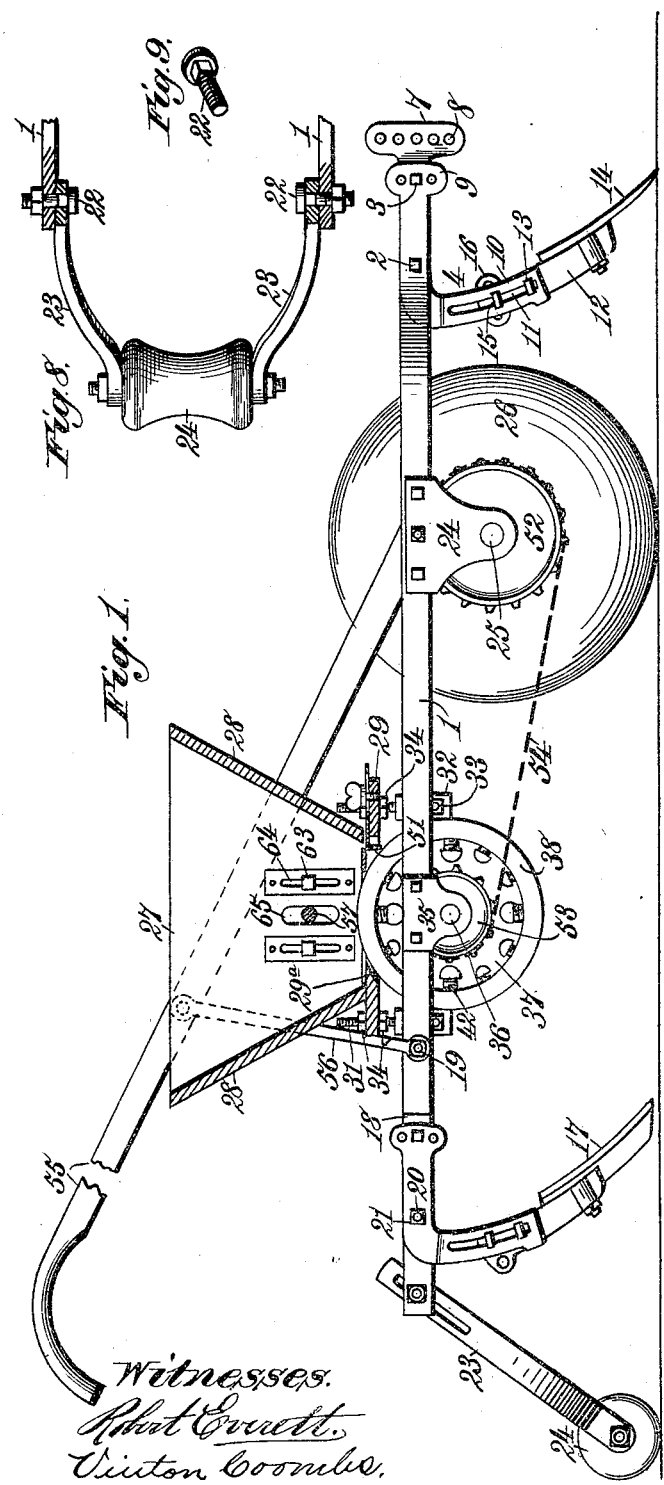
Witnesses.
Robt Everett.
Vinton Coombs.
Inventor.
James A. Autry,
By James L. Norris.
Atty.

No. 611,805. Patented Oct. 4, 1898.
J. A. AUTRY.
COMBINED SEED PLANTER AND FERTILIZER DISTRIBUTER.
(Application filed Nov. 29, 1897.)
(No Model.) 2 Sheets—Sheet 2.
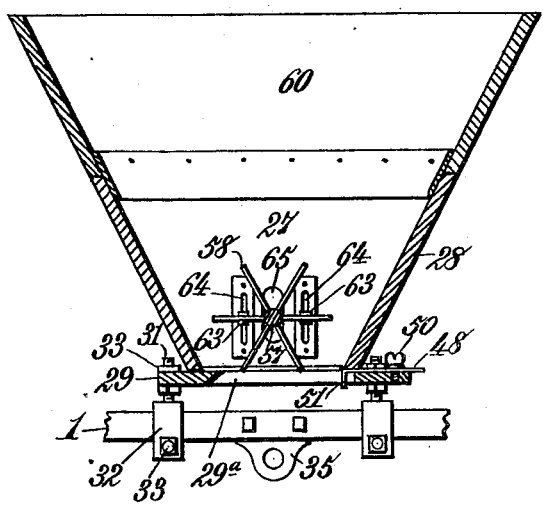
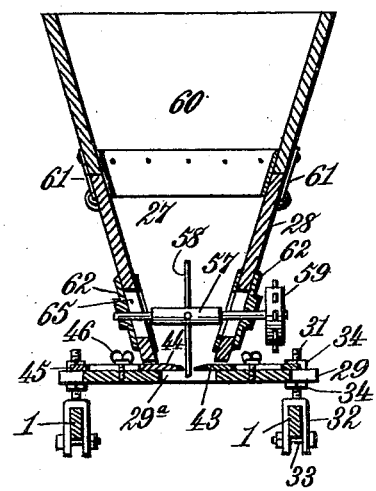
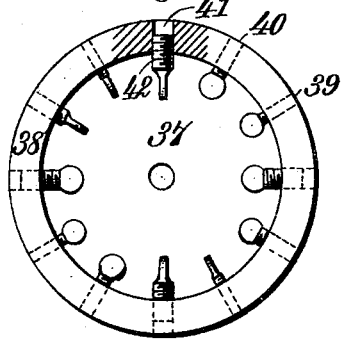
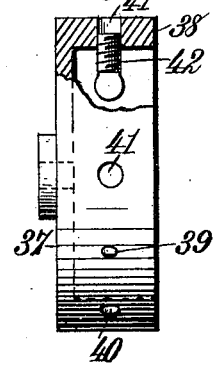
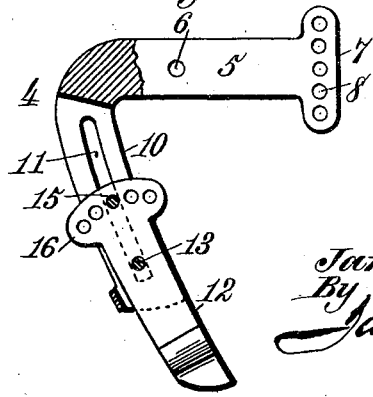
Witnesses.
Robert Everett,
Vinton Coombs.
Inventor.
James A. Autry.
By James L. Norris
Atty.
THE NORRIS PETERS CO., PHOTO-LITHO., WASHINGTON, D. C.

UNITED STATES PATENT OFFICE.

JAMES A. AUTRY, OF PINE GROVE, MISSISSIPPI.

COMBINED SEED-PLANTER AND FERTILIZER-DISTRIBUTER.

SPECIFICATION forming part of Letters Patent No. 611,805, dated October 4, 1898.

Application filed November 29, 1897. Serial No. 660,129. (No model.)

*To all whom it may concern:*

Be it known that I, JAMES A. AUTRY, a citizen of the United States, residing at Pine Grove, in the county of Benton and State of Mississippi, have invented new and useful Improvements in a Combined Seed-Planter and Fertilizer-Distributer, of which the following is a specification.

This invention relates to combined seed-planters and fertilizer-distributers, and has for its object to provide in such an implement improved means for adapting it for planting seeds of various kinds in different quantities and in hills at different distances apart, to provide improved means for adapting the machine to distributing fertilizer, to provide improved means for varying the depth at which the opening and covering plows work and for adjusting them to throw them out of contact with the ground while the machine is being carried to and from the field, to provide novel means for controlling the feed from the hopper, and, finally, to improve and simplify the construction and render more efficient the operation of this class of farm implements generally.

To these ends my invention consists in the features and in the construction, arrangement, and combination of parts hereinafter described, and particularly pointed out in the claims following the description, reference being had to the accompanying drawings, forming a part of this specification, wherein—

Figure 1 is a side elevation, partly in section, of my improved implement, showing it arranged for planting corn and similar seed. Fig. 2 is a partial top plan view, some of the parts being omitted for the sake of greater clearness. Fig. 3 is a vertical longitudinal central section illustrating the hopper and feed mechanism adjusted for planting seed, such as cotton-seed, or distributing fertilizer. Fig. 4 is a similar view taken at a right angle to Fig. 3. Fig. 5 is a detail side elevation of the seed-wheel. Fig. 6 is an end elevation thereof, partly in section. Fig. 7 is a detail view of the furrow-opening plow. Figs. 8 and 9 are detail views illustrating the fastenings for the ridge-roller-supporting arms.

Referring to the drawings, the numeral 1 indicates two beams which practically constitute the frame of the machine. Said beams preferably consist of metallic bars which for the major portion of their length are arranged parallel with one another and at their front ends are bent toward each other and united by bolts 2 and 3. Between the front ends of the beams 1 is secured the standard 4 of the furrow-opening plow. Said standard consists of a horizontal arm 5, adapted to lie between the front ends of the beams 1 and having a bolt-hole 6, through which passes the bolt 2, before referred to. The bolt 2 forms a pivot about which the arm 5 may be turned. The forward end of the arm 5 projects beyond the extreme front ends of the beams 1 and is provided with a head 7, having a series of vertically-disposed perforations 8. The perforated head 7 constitutes a clevis, to which the team may be hitched in a well-known manner. The forward ends of the beams 1 are formed with segments 9, having a plurality of vertically-disposed bolt-holes, through which passes the bolt 3. By changing the bolt 3 from one hole to another in the segments 9 the arm 5 will be adjusted about the bolt 2 as a center, thus regulating the depth of penetration of the plow carried by the standard. The arm 5 is provided at its rear end with a downwardly and forwardly depending arm 10, which is slotted longitudinally, as at 11. The plow-foot 12 is longitudinally adjustable on the arm 10 by a bolt 13, which passes through the foot 12 and through the slot 11, and hence by loosening said bolt the plow 14, carried by the foot, may be lowered to penetrate the soil or raised to lift the plow out of contact with the earth for the purpose hereinafter explained and may be locked in its adjusted position by tightening up said bolt. The angle and depth of penetration of the plow may be still further regulated by means of a bolt 15, which passes through the slot 11 and through any one of a plurality of bolt-holes formed in a segment 16 on the upper end of the foot 12.

Covering-plows 17 are attached to the rear ends of the beams by means of standards similar to that carrying the furrow-opening plow, excepting that the clevises 8 are omitted. In order that the covering-plows 17 shall be in alinement with the beams 1, I offset the rear ends of the beams, as most clearly shown at 18 in Fig. 2, so that the arms 5 of the plow-standards will lie in the same plane as the beams. A tie-bolt 19 is fixed in the beams near their rear ends and operates to hold said beams parallel and at a fixed distance apart, while an adjusting-bolt 20 is passed through the rear ends of the offset portions 18 of the beams, and by adjusting the nuts 21 on the bolt 20 the offset portions of the beams may be drawn toward each other or spread apart to a limited extent to regulate the distance between the covering-plows.

The rear ends of the beams extend beyond the horizontal arms of the covering-plow standards, as shown, and to said rear extensions are attached downwardly and rearwardly curved arms 23, in the lower ends of which is journaled the shaft of a concave ridge-roller 24. The upper ends of the arms 23 are each provided with elongated slots, through which pass bolts 22, said bolts also passing through suitable bolt-holes formed in the extended ends of the beams and having nuts screwed over their outer threaded ends. Those portions of the bolts which pass through the slots in the arms 23 are square in cross-section, so that said arms cannot turn on the bolts. By means of the slots the arms 23 may be adjusted toward or from the covering-plows, and by loosening the nuts the arms may be raised up to elevate the ridge-roller. After the implement has been adjusted to the work to be performed the ridge-roller will be permitted to drop and the nuts on the bolts tightened up to hold the roller fixed. I prefer to make the arms of slightly-resilient metal, in order that they may have a yielding movement toward each other. The roller not only levels and packs the ridge, as hereinafter described, but aids in supporting the rear part of the machine and regulating the depth of the covering-plows.

Attached to the beams near their forward portions are downwardly-depending journal-boxes 24, in which is journaled a shaft 25, carrying a disk furrow-wheel 26. This wheel, as most clearly shown in Fig. 2, is of the form of a convexo-convex disk, which is adapted to run in the furrow opened by the plow 14 and prepare it for the reception of the seed.

Adjustably mounted on the beams in rear of the furrow-wheel 26 is a hopper 27. Said hopper consists of the inwardly-inclined walls 28, fixed on a bottom 29, which is apertured centrally, as at 29ª, to approximately correspond to the lower ends of the walls 28. Each corner of the bottom 29 is formed with a perforated ear 30, through which passes a bolt 31. There are four such bolts, one for each ear, and each bolt at its lower end is forked or bifurcated, as at 32, and as most clearly shown in Fig. 4, and straddles the beams 1, to which latter the forked ends of the bolts are fastened or clipped by bolts 33. Nuts 34 are arranged on the upper threaded ends of the bolts 31 both above and below the ears 30, and by adjusting the nuts on the bolts the hopper may be raised and lowered. The hopper may likewise be adjusted forward and backward on the beams by first loosening the bolts 33 for the purpose hereinafter made apparent.

Bolted to the beams 1, beneath the hopper 27, are downwardly-depending journal-boxes 35, in which is journaled a shaft 36, and on said shaft is fixed the seed-wheel 37. Said seed-wheel consists of a metallic disk having a circumferential flange 38. The flange 38 is provided with a plurality of apertures 39, 40, and 41, which extend entirely through the flange and are interiorly threaded. In each of said apertures is screwed a plug or thumb-screw 42, which is constructed to be turned by the finger and thumb, as shown, whereby the depth of the apertures may be regulated or said apertures filled up or cut off entirely. As shown most clearly in Figs. 5 and 6, the apertures in the seed-wheel are formed in several series, there being shown in the present instance four such series, each comprising three apertures 39 40 41, the apertures 40 being larger than the apertures 39 and the apertures 41 being larger than the apertures 40 for the purpose hereinafter described. The periphery of the seed-wheel projects through the aperture in the bottom of the hopper 27, and the apertures 39, 40, and 41 therein form seed-cups, which as the seed-wheel rotates in the hopper receive the seed in regulated quantities and drop it at regular distances apart into the furrow. For the purpose of regulating the feed I provide the following means: Arranged on the bottom 29 of the hopper are two slides 43 and 44, each of which is provided with a slotted extension 45. Thumb-screws 46 are fitted in the hopper-bottom 29 and pass through the slotted extensions 45. It will be manifest that by first loosening the screw 46 the slides 43 and 44 may be adjusted transversely across the hopper-bottom toward and from each other to increase or diminish the width of the opening 29ª or to close said opening entirely, and one of said slides, as 44, is provided with an arm 47, that extends transversely across the forward end of the opening 29ª. A spring cut-off 48 is arranged on the forward end of the bottom of the hopper. As most clearly shown in Fig. 2, the shank of said cut-off is slotted, as at 49, through which passes a thumb-screw 50 and engages a threaded hole in the hopper-bottom. The rear end of the spring cut-off is bent downward at a right angle, as at 51, and at its lower edge is in light contact with the periphery of the seed-wheel. By first loosening the thumb-screw 50 the spring cut-off may be adjusted to compensate for any wear resulting from its contact with the seed-wheel or to adjust it in proper relation to said wheel.

On the shafts of the furrow-wheel and seed-wheel are respectively fixed sprocket-wheels 52 and 53, which are connected by a sprocket-chain 54, so that the rotation of the furrow-wheel 26 in the furrow causes the seed-wheel to rotate in the bottom of the hopper.

To the beams are fixed the usual handles 55, braced to the beams by stay-rods 56, by which the machine is guided.

The operation of the machine constructed and arranged in the manner above described is as follows: The opening-plow 14 and covering-plows 17 are first adjusted to plow to the desired depth and angle. The slides 43 and 44 are then adjusted to properly engage the periphery of the seed-wheel and the cut-off 48 adjusted to cause its lip 51 to lightly contact therewith. The plugs 42 are next adjusted in their seed-cups to regulate the quantity of seed that they will contain and to entirely close up such of said seed-cups as it is not desired to employ. For example, suppose it is desired to plant corn in hills at certain distances apart and a certain number of grains to each hill. Then the plugs in the seed-cups 41 will be adjusted in such manner that said cups will each receive the desired number of grains and the other plugs will be adjusted to entirely close the seed-cups 39 and 40. Then at each quarter-revolution of the seed-wheel the desired number of grains will be dropped into the furrow, the hills being formed at a distance apart equal to one-fourth the circumference of the seed-wheel. It will be manifest that if it be desired to plant the hills closer together with the same number of grains in each hill as before, such additional seed-cups may be thrown into operation as may be found necessary or desirable by adjusting the plugs in, say, every third or every fourth seed-cup, the plugs in the smaller seed-cups being withdrawn farther than in the larger seed-cups, so as to cause each cup to receive approximately the same number of grains. The cups having been adjusted in the manner desired and the corn-seeds having been placed in the hopper, the machine is ready for planting. As the implement is drawn forward by the team the plow 14 operates to open the furrow, and the furrow-wheel 26 follows in the furrow and smooths out and prepares the furrow for the reception of the seeds. As the seed-wheel 38 rotates in the bottom of the hopper such of the seed-cups as have been adjusted for the purpose will be successively brought beneath the seed and the latter will drop into and fill the seed-cups. As the seed-cups pass under the arm 47 of the slide 44 said arm prevents the seed in the hopper from crowding against and interfering with the proper operation of the cut-off 50, and as the seed-cups pass under the lip 51 of said cut-off it levels off the seed-cups and prevents them from carrying out seed in excess of the desired number. As each seed-cup reaches a certain point in the revolution of the seed-wheel it discharges its seed into the furrow. The covering-plows then operate to throw the soil toward each other, covering the seed and forming a ridge which is afterward packed down upon the seed and evened off by the concave roller 24. During the rotation of the seed-wheel it sometimes occurs that an end of a grain of corn will protrude from a seed-cup, and by making the cut-off 50 in the form of a spring its lip 51 will yield and thus permit such grain to pass on without injury and be planted in the furrow with the other grains. For planting small seed the plugs in the larger seed-cups may be adjusted to entirely close them, only the intermediate-sized or smallest-sized cups being utilized.

In planting such seed as cotton-seed and the like the seed is apt to pack in the seed-cups, so that it will not be dropped, and in such cases I remove the seed-wheel and provide stirrers for causing the seed to be fed down by the hopper, as shown in Figs. 3 and 4. Referring to said figures, the numeral 57 indicates the stirrer-shaft, which is journaled in bearings on the sides of the hopper and is provided with a plurality of stirrer-arms 58, which when the shaft is properly adjusted are adapted to rotate in the opening in the bottom of the hopper. On one end of the stirrer-shaft 57 is fixed a sprocket-wheel 59, which is adapted to be connected to the sprocket-wheel 52 on the shaft of the furrow-wheel by the sprocket-chain 54. By adjusting the hopper longitudinally on the beams by loosening the bolts 33, as before described, the tension of the sprocket-chain can be regulated and by means of the bolts 31 the hopper may be adjusted vertically to compensate for wear. After removing the seed-wheel and connecting the stirrer-shaft with the furrow-wheel in the manner described the slides 43 and 44 should be moved toward each other to contract the opening in the bottom of the hopper to the desired size—say, for example, to about one-fourth of an inch in width, slightly more or less—where cotton-seed is to be planted. Then as the machine is drawn forward the stirrer-shaft will be rotated by the furrow-wheel and the stirrer will successively sweep through the opening between the slides, keeping the seed stirred up and preventing clogging and feeding it between the slides, from whence it drops into the furrow and is covered up in the manner before described. It will be understood that the slides 43 and 44 are to be adjusted toward and from each other in such manner as to suit the size and character of the seed being planted. In planting cotton-seed I prefer to increase the capacity of the hopper by arranging on top thereof an extension 60, the walls of which extension preferably lie in the same plane as the walls of the hopper 27, and fasten the extension in place on said hopper by means of catches 61 of any suitable or preferred construction.

In order to vertically adjust the stirrer-shaft 57, I journal said shaft in plates 62, which are arranged on the sides of the hopper 27 and are secured thereto by bolts 63, which pass through said plates and through vertical slots 64, formed in the sides of the hopper. Vertical slots 65 are also formed in the sides of the hopper, between the slots 64, in which the stirrer-shaft may move vertically. By loosening the bolts 63 the plates in which the stirrer-shaft is journaled may be moved up or down to regulate the distance to which the stirrers may project between the slides 43 and 44 or to raise said stirrers entirely above the bottom of the hopper.

The construction illustrated in Figs. 3 and 4 is also well adapted for distributing fertilizer, the stirrers agitating the fertilizer and preventing it from clogging and, in connection with the adjustable slides, feeding it in desired quantities. The plows 17 operate to mix up the soil and fertilizer and cover the latter over.

In moving the implement to and from the field I loosen the bolts 13 and 15 and raise the plow-feet up as far as the slots 11 will permit, thus raising the plows 14 and 17 out of contact with the ground, and then again tighten up the bolts. The implement may then be drawn to and from the field on the furrow-wheel, the plows being sufficiently elevated above the ground to avoid being caught by grass, snags, and the like.

Having described my invention, what I claim is—

1. The combination with a hopper, of a seed-wheel arranged to rotate in the lower end of the hopper and provided with a circumferential flange having a plurality of interiorly-threaded radial seed-cups, and threaded plugs adjustably fitted in said seed-cups and provided at their inner ends with means adapted to be grasped by the fingers for turning the plugs to increase or diminish the capacities of the seed-cups, and a longitudinally-adjustable cut-off to contact with the periphery of the seed-wheel, substantially as described.

2. The combination with the beams, of a seed-wheel arranged to rotate between said beams and provided with a circumferential flange having a plurality of seed-cups, and a vertically-adjustable hopper supported on the beams above the seed-wheel, substantially as described.

3. The combination with the beams, and a furrow-opening plow and covering-plows carried thereby, of a hopper supported on the beams and provided at its bottom with two transversely-adjustable slides arranged to regulate the width of the opening in the hopper-bottom, a seed-wheel, and a longitudinally-adjustable cut-off, substantially as described.

4. The combination with the beams, of a seed-wheel arranged to rotate between the beams and provided with a circumferential flange having a plurality of seed-cups, a hopper supported on the beams above the seed-wheel, two transversely-adjustable slides fitted in the bottom of the hopper and arranged to embrace the sides of the seed-wheel, one of said slides being provided at one end with an arm extending transversely across the periphery of the seed-wheel, substantially as described.

5. The combination with the beams, of a seed-wheel arranged to rotate between the beams and provided with a circumferential flange having a plurality of seed-cups, a hopper adjustably supported on the beams above the seed-wheel, and a longitudinally-adjustable spring cut-off arranged to contact with the periphery of the said flange, substantially as described.

6. The combination with the beams, of a seed-wheel arranged to rotate between the beams and provided with a circumferential flange having a plurality of seed-cups, a hopper supported on the beams above the seed-wheel, a spring cut-off arranged to contact with the periphery of the said flange, and two transversely-adjustable slides fitted in the bottom of the hopper and arranged to embrace the sides of the seed-wheel, one of said slides being provided at one end with an arm extending transversely across the periphery of the seed-wheel above and in front of the cut-off, substantially as described.

7. The combination with the beams 1, of a seed-wheel 37 arranged to rotate between said beams and provided with a circumferential flange having a plurality of seed-cups, threaded bolts 31 attached to the beams, a hopper 27 having a bottom loosely fitted over the bolts 31, and nuts 34 arranged on the said bolts above and below the hopper-bottom whereby the hopper may be adjusted vertically, and adjustable slides 43 44 arranged in the bottom of the hopper for regulating the opening therein, substantially as described.

8. The combination with the beams 1, of a seed-wheel 37 arranged to rotate between the beams and provided with a circumferential flange having a plurality of seed-cups, threaded bolts 31 having forked or bifurcated ends 32 adjustably clipped on the beams, a hopper 27 supported on said bolts, a furrow-wheel journaled on the beams in front of the seed-wheel, and sprocket-wheels fixed on the shafts of the furrow and seed wheels and connected by a chain, substantially as described.

9. The combination with the beams and a furrow-wheel journaled on the beams, of a vertically-adjustable hopper supported on the beams in rear of the furrow-wheel, laterally-adjustable slides arranged in the bottom of the hopper, a seed-wheel, and sprocket-wheels fixed on the shafts of the seed-wheel and furrow-wheel and connected by a chain, substantially as described.

10. The combination with the beams and a furrow-wheel journaled on the beams, of a hopper supported on the beams and longitudinally adjustable thereon, laterally-adjustable slides arranged in the bottom of the hopper, a seed-wheel adapted to revolve between the adjustable slides, and sprocket-wheels fixed on the seed-wheel and furrow-wheel shafts and connected by a chain, substantially as described.

11. The combination with the beams, the furrow-wheel journaled on the beams, a seed-wheel, and the hopper adjustably supported on the beams above the seed-wheel and in rear of the furrow-wheel, of a furrow-opening plow adjustably attached to the forward end of the beams and covering-plows adjustably attached to the rear end thereof, a means for regulating the depth of penetration of said plows and means for raising said plows out of contact with the ground, substantially as described.

12. The combination with the beams, of the furrow-wheel journaled thereon, a seed-wheel, the hopper adjustable on the beams in rear of the furrow-wheel, a furrow-opening plow attached to the beams in front of the furrow-wheel, covering-plows attached to the beams in rear of the hopper, adjustable depending arms attached to the rear ends of the beams, and a roller journaled in the free ends of said arms, substantially as described.

13. The combination with the beams 1 having offset rear-end portions 18, the covering-plows attached to said offset end portions, the furrow-opening plow attached to the forward end of the beams, and a furrow-wheel and hopper carried by the beams, substantially as described.

14. The combination with the beams and the furrow-wheel and hopper carried thereby, of plow-standards attached to said beams and carrying plows, each of said standards consisting of a horizontal arm 5 pivoted intermediate its ends to the beams and adjustably attached thereto at its forward end, a downwardly and forwardly bent arm 10 depending from the rear end of the arm 5 and slotted longitudinally, as at 11, a plow-foot 12 provided at its upper end with a segment 16 having a plurality of bolt-holes, a bolt 13 passing through the slotted arm and the plow-foot, and a bolt 15 passing through the slotted arm and adapted to engage either of the bolt-holes in said segment, substantially as described and for the purpose specified.

In testimony whereof I have hereunto set my hand in presence of two subscribing witnesses.

JAS. A. AUTRY.

Witnesses:
J. J. HUDSPETH,
A. J. SIMPSON.